Figure 1:
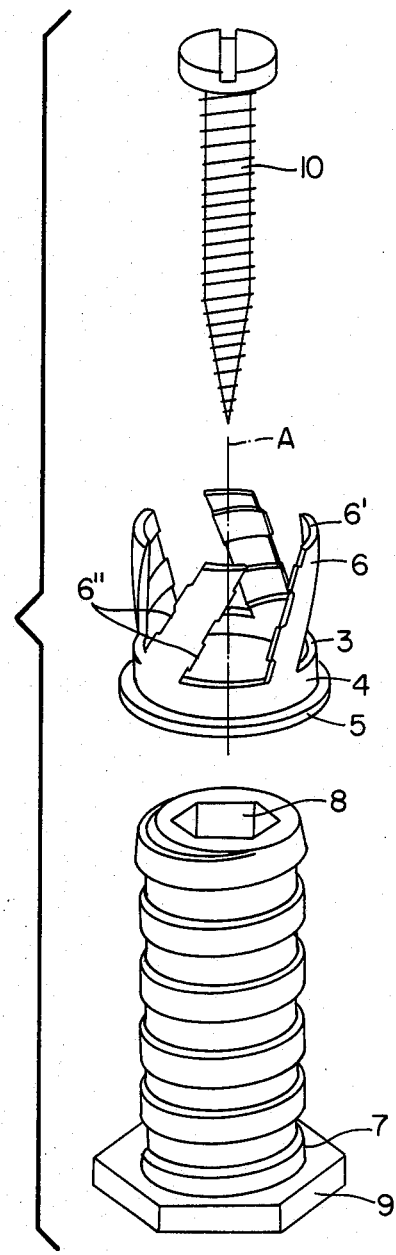

United States Patent [19]

Lien et al.

[11] Patent Number: 4,662,807
[45] Date of Patent: May 5, 1987

[54] ADJUSTABLE FASTENER FOR JOINING OF TWO STRUCTURAL ELEMENTS

[76] Inventors: Per Lien, Morkelstein 7, 1500 Moss; Terje Edvardsen, Fregattvn. 3, 1600 Fredrikstad, both of Norway

[21] Appl. No.: 816,217

[22] Filed: Jan. 6, 1986

[30] Foreign Application Priority Data

Feb. 13, 1985 [NO] Norway ................................. 850547

[51] Int. Cl.$^4$ ........................... F16B 33/02; E04B 1/38
[52] U.S. Cl. ....................................... 411/368; 52/364; 52/126.5
[58] Field of Search ................. 52/126.5, 126.6, 126.7, 52/217, 364, 365, 508, 513; 411/338, 368, 339, 180, 468, 372, 364

[56] References Cited

U.S. PATENT DOCUMENTS

| 1,718,171 | 6/1929 | Mills ..................................... 411/338 |
| 2,358,783 | 9/1944 | Best . |
| 3,511,001 | 5/1970 | Morgan ............................... 52/126.5 |
| 4,238,987 | 12/1980 | Siebrecht-Reuter ................... 52/513 |

FOREIGN PATENT DOCUMENTS

| 234981 | 12/1963 | Austria ................................... 52/365 |
| 2915115 | 12/1979 | Fed. Rep. of Germany ..... 52/126.6 |
| 48439 | 9/1930 | Norway . |
| 151383 | 12/1984 | Norway . |
| 390658 | 4/1973 | Sweden . |
| 1244498 | 9/1971 | United Kingdom .................. 52/217 |

Primary Examiner—James L. Ridgill, Jr.
Attorney, Agent, or Firm—Holman & Stern

[57] ABSTRACT

An adjustable fastener, preferably made from metal, for joining two structural elements (1, 2). Said fastener essentially consists of a holding element (3) comprising a relatively narrow sleeve-like ring (4), and tongue-like or ear-like members (6) projecting from the circumference of said ring (4); and a force transmitting member (7) provided with a through hole (8). Due to its special design, said holding element (3) will lock to structural element (1) and, thus, constitute a stable holding member for said force transmitting member (7).

3 Claims, 2 Drawing Figures

ADJUSTABLE FASTENER FOR JOINING OF TWO STRUCTURAL ELEMENTS

The present invention relates to an adjustable fastener for usage when two structural elements are to be joined.

It is known to use adjustable fasteners, especially when frames, sashes or the like are to be mounted in adapted openings or in building structures etc. Thus, GB-PS No. 1 244 498 discloses a fastener by the aid of which it is possible to make fine adjustments of the position of window frames in relation to the surrounding building structure at the same time as said window frame is secured to said structure. The adjustable fastener according to said Specification is essentially characterized in that it consists of an externally threaded pin adjustably inserted into a threaded through hole in the window frame. Said threaded pin projects from the lateral surface of the window frame facing the surrounding building structure, and when said window frame is mounted the end of said pin will contact and engage said building structure. Said pin is provided with a through hole, through which a nail is inserted to be driven into the surrounding structure. Thus, said pin and the window frame with it is definitely secured to the surrounding structure. The threaded through hole in the window frame according to said Specification simply consists of a threaded hole in the window frame per se or it consists of an inserted lining that is internally threaded.

Obviously, the threaded through hole in the window frame as disclosed in GB-PS No. 1 244 498 will cause a considerable weakening of the mechanical strength of the window frame in the areas in question. Often, it will also be necessary to readjust window frames or the like some time after they were mounted. In connection with such a readjustment great forces will occur when the adjustable pin is turned, and if the threaded hole consists of a lining as disclosed in said Specification, this lining will probably become undone from its fixation to the window frame per se.

In Norwegian Pat. No. 151.383 the inventor of the present application disclosed a fastener largely eliminating the above mentioned disadvantages. With the fastener disclosed in said Patent a fastener is provided which essentially prevents weakening of the window frame by relatively large through holes. Another important object of said invention was to provide a fastener that is able to resist the great forces occurring in connection with readjustments. The fastener according to said Patent is of the kind comprising a holding member mounted in a corresponding recess in the lateral surface of the frame or sash facing the building structure. From said recess a hole having a relatively small cross section runs to the opposite lateral surface of said frame or sash. Said holding member is provided with an internally threaded through hole. Said fastener, furthermore, comprises a thrust member partly threaded externally and provided with a through hole, and furthermore, a screw or similar securing member for securing said fastener to said building structure. Said fastener is essentially characterized by, additionally, comprising a locking member for securing said holding member in the frame or sash, and the internal hole of the thrust member is provided with a stop in the lowermost portion positioned closest to said building structure, and that said hole for the rest is partly or entirely provided with a polygonal cross section.

According to a preferred embodiment of the invention disclosed in Norwegian Pat. No. 151.383 the portion of the holding member positioned innermost in the recess consists of a head, and the locking ring surrounding said holding member is provided with an innermost portion that is slit.

The thrust member, i.e. the member comprising the externally threaded pin position with its head being in contact with the recess surface of the building structure, is commonly secured to said building structure, preferably by a screw having its head in contact with a stop provided so far inside the internal through hole of the thrust-member that the portion facing the inside of the frame or sash remains free when said screw is mounted. The last mentioned portion of said hole is shaped for insertion of a tool by the aid of which said thrust member may be turned and adjusted when said screw has been slackened.

In connection with mounting the fastener disclosed in the above mentioned Patent it is, inter alia, necessary to drill two bores in the window frame, i.e. one bore to form said relatively narrow through hole in said window frame, and a second bore to provide a wider recess receiving said holding member with its surrounding locking ring. Apart from said two different drilling operations that have to be carried out, it will be obvious that the wide recess in said window frame for receiving said holding member will result in a certain weakening of the window frame per se.

The adjustable fastener according to the present invention is, in principle, the same kind as the fastener disclosed in the Norwegian Pat. No. 151.383 as regards its function. According to the present invention, however, said holding member is made from a metallic material and is shaped in such a manner that it is self-locking when mounted in said through hole in one of the structural members. By manufacturing said holding member from metal it will be possible to use such a thin-walled dimension that said holding member can be inserted directly into said relatively narrow hold in one of the structural members. With the fastener according to the present invention the locking ring that was necessary according to said Norwegian Patent is, thus, eliminated as well.

The adjustable fastener provided according to the present invention is preferably made of metal and intended for joining two structural members. The adjustable fastener comprises a holding member mountable in an adapted through hole in one of the two structural members to be joined, whereby said holding member is mounted on the side of said one structural member facing the other structural member. Said holding member is internally threaded. Furthermore, said fastener comprises a force transmitting member partly threaded externally to be screwed into said holding member and provided with a through hole having a stop for a screw head or the like in one end and said hole for the rest being entirely or partly shaped with a polygonal cross section. Said holding member consists of a relatively narrow sleeve-like ring, and from the circumference of said ring several tongue-shaped or ear-shaped members project approximately normal to said circumference and cause the holding element to be locked to one of the structural elements. Said fastener is essentially characterized in that tongue-shaped or ear-shaped members have corrugated edge faces and are somewhat inclined relative to the vertical center line of said sleeve-like ring. Additional characterizing features will appear from the following claims.

Figure 2:
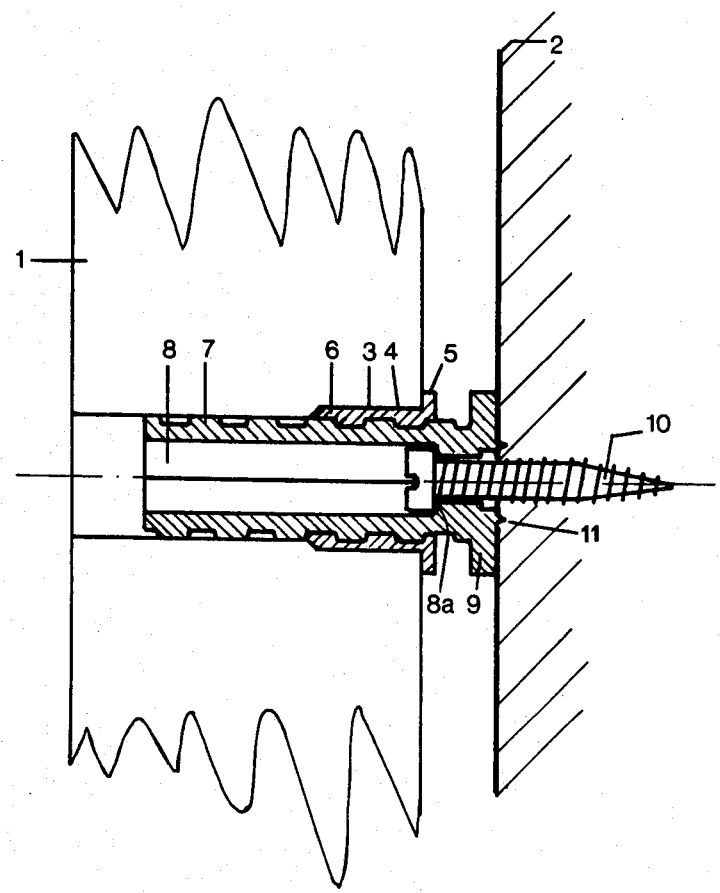

An embodiment of the invention will be described below with reference to the drawings, where FIG. 1 shows the two members comprising the fastener per se in perspective, as well as a screw; and FIG. 2 shows said fastener and the screw mounted for joining two structural elements.

FIG. 1 shows the screw 10, the holding member 3 consisting of a sleeve-like ring 4 having a collar 5. Projecting from said ring 4 are tongue-like or ear-like members 6 which are internally threaded and provided with corrugated edges 6″ and a chambered end face 6′. FIG. 1, furthermore, shows the force transmitting member 7 with its hole 8 being polygonal in cross-section in the uppermost portion and showing a polygonally shaped head 9 at the other end.

FIG. 2 shows a fastener in a mounted state. Holding member 3 has been mounted in a through hole in structural element 1. The force transmitting member 7 is screwed into holding member 3 and with its head 9 is in contact with the other structural element 2. By the aid of said raised circular edge 11 member 7 engages structural element 2 and is secured to said structural element 2 by the aid of a screw 10. The head of screw 10 is in contact with a stop 8a in the hole 8 of the force transmitting member.

It will be obvious, that when said fastener is to be mounted in structural element 1, it is only necessary to knock said fastener consisting of the two mentioned members in the bored hole in said structural element. Said structural element 1 is presupposed to be made of a relatively soft material, e.g. wood. When structural element 1 is, later, to be joined with structural element 2 it will be necessary to turn said force transmitting element 7. Thus, a force or thrust is transmitted to said holding element 6, and the tongue-like or ear-like members 6 will penetrate further into the material of structural element 1, among others with their rough edges and, thus, lock to said structural element. When element 7 has been turned screw 10 may be secured.

We claim:

1. An adjustable fastener, preferably made from metal, for joining two structural elements, the fastener comprising a holding element for mounting in a through bore formed in a first of the structural elements from one side of the first structural element facing a second of the structural elements, the fastener further comprising a force transmitting element, a part of which is externally threaded for threading into a holding element and which is provided with a through hole including a stop for a screw head or the like adjacent one end of the through hole, the through hole being at least in part shaped with a polygonal cross section, the holding element comprising a ring with a central axis and circumferentially spaced elongate tongue-like members projecting from one end of the ring for locking the holding member in the first structural element, the tongue-like members being internally threaded, having corrugated longitudinal edges, and being inclined circumferentially relative to the axis of the ring.

2. An adjustable fastener as claimed in claim 1 wherein the holding element includes a collar on the ring at and end of the ring opposite said one end.

3. An adjustable fastener as claimed in claim 1 wherein each tongue-like member has an end surface with an innermost edge and an outermost edge, the innermost edge being higher that the outermost edge.

* * * * *